US012566343B2

(12) United States Patent
Ye et al.

(10) Patent No.: US 12,566,343 B2
(45) Date of Patent: Mar. 3, 2026

(54) THIN FILM LITHIUM-CONTAINING PHOTONICS WAFER HAVING A TRAP-RICH SUBSTRATE

(71) Applicant: HyperLight Corporation, Cambridge, MA (US)

(72) Inventors: Fan Ye, Lincoln, MA (US); Christian Reimer, Wellesley, MA (US); Mian Zhang, Cambridge, MA (US); Kevin Luke, Cambridge, MA (US); Amirmahdi Honardoost, Somerville, MA (US)

(73) Assignee: HyperLight Corporation, Cambridge, MA (US)

( * ) Notice: Subject to any disclaimer, the term of this patent is extended or adjusted under 35 U.S.C. 154(b) by 0 days.

(21) Appl. No.: 18/942,189

(22) Filed: Nov. 8, 2024

(65) Prior Publication Data

US 2025/0155739 A1     May 15, 2025

Related U.S. Application Data

(60) Provisional application No. 63/548,138, filed on Nov. 10, 2023.

(51) Int. Cl.
| | |
|---|---|
| *G02F 1/035* | (2006.01) |
| *G02B 6/12* | (2006.01) |
| *G02B 6/293* | (2006.01) |
| *G02F 1/00* | (2006.01) |
| *G02F 1/313* | (2006.01) |

(52) U.S. Cl.
CPC ....... *G02F 1/0356* (2013.01); *G02B 6/12002* (2013.01); *G02B 6/29338* (2013.01); *G02B 6/29343* (2013.01); *G02F 1/0027* (2013.01); *G02F 1/3132* (2013.01); *G02F 2202/20* (2013.01)

(58) Field of Classification Search
CPC ... G02F 1/0356; G02F 1/0027; G02F 2202/20
USPC ......................................... 385/1–3
See application file for complete search history.

(56) References Cited

U.S. PATENT DOCUMENTS

| | | |
|---|---|---|
| 2006/0092498 A1 | 5/2006 | Sato |
| 2011/0064352 A1 | 3/2011 | Nakagawa |

(Continued)

FOREIGN PATENT DOCUMENTS

| | | |
|---|---|---|
| WO | 2012087580 | 6/2012 |

OTHER PUBLICATIONS

"Low-Loss CPW Lines on Surface Stabilized High-Resistivity Silicon" by Gamble et al, IEEE Microwave and Guided Wave Letters, vol. 9, No. 10, pp. 395-397 (Year: 1999).*

(Continued)

*Primary Examiner* — Robert Tavlykaev
(74) *Attorney, Agent, or Firm* — Van Pelt, Yi & James LLP

(57) ABSTRACT

A substrate configured for an electro-optic device and an electro-optic device formed using the substrate are described. The substrate includes a semiconductor substrate, an insulating layer, and at least one thin film optical material. The semiconductor substrate includes a trap-rich layer and an underlying substrate layer. The insulating layer is on the semiconductor substrate, The trap-rich layer is between the underlying substrate layer and the insulating layer. The thin film optical material(s) have an electro-optic effect and are on the insulating layer.

16 Claims, 13 Drawing Sheets

(56) References Cited

U.S. PATENT DOCUMENTS

| | | | |
|---|---|---|---|
| 2013/0084689 A1 | 4/2013 | Arriagada | |
| 2014/0205229 A1 | 7/2014 | Thaniyavarn | |
| 2020/0304095 A1* | 9/2020 | Hori | H03H 9/02559 |
| 2021/0242071 A1* | 8/2021 | Colinge | H01L 21/02686 |
| 2021/0286203 A1* | 9/2021 | Safian | G02B 6/13 |
| 2021/0405399 A1 | 12/2021 | Teo | |
| 2021/0407850 A1* | 12/2021 | Bowman | H01L 21/02274 |
| 2022/0148908 A1* | 5/2022 | Augendre | H01L 21/02002 |
| 2022/0189994 A1* | 6/2022 | Augendre | H01L 21/3223 |
| 2022/0359273 A1* | 11/2022 | Wu | H01L 21/76256 |
| 2023/0056833 A1* | 2/2023 | Sugiyama | G02F 1/0356 |
| 2023/0094739 A1* | 3/2023 | Qi | H01L 29/16 257/347 |
| 2023/0245922 A1* | 8/2023 | Kouassi | H01L 21/76243 257/347 |
| 2024/0113680 A1* | 4/2024 | Goto | H03H 9/6483 |
| 2024/0248331 A1* | 7/2024 | Jacques | G02F 1/0316 |

OTHER PUBLICATIONS

Ali et al., RF SOI CMOS Technology on Commercial Trap-Rich High Resistivity SOI Wafer, In 2012 IEEE International SOI Conference (SOI), 2012, 2 pages.

Anida et al., RF-SOI Engineered Substrates at the Heart of Modern RF mmWave Front-ends, 2. 5G will not only change how we communicate with each other but how we communicate with our environment, EE Times Europe, Nov. 30, 2020, 11 pages, https://www.eetimes.eu/rf-soi-engineered-substrates-at-the-heart-of-modern-rf-mmwave-front-ends/2/.

Anida et al., RF-SOI Engineered Substrates at the Heart of Modern RF mmWave Front-ends, 3. Innovation in RF-SOI substrates for 5G, EE Times Europe, Nov. 30, 2020, 6 pages, https://www.eetimes.eu/rf-soi-engineered-substrates-at-the-heart-of-modern-rf-mmwave-front-ends/3/.

Anida et al., RF-SOI Engineered Substrates at the Heart of Modern RF mmWave Front-ends, Part 1: 5G, EE Times Europe, Nov. 30, 2020, 5 pages, https://www.eetimes.eu/rf-soi-engineered-substrates-at-the-heart-of-modern-rf-mmwave-front-ends/.

Okmetic, UF-RFSi—Ultra Flat High Resistivity wafers, Nov. 7, 2024, 12 pages, https://www.okmetic.com/silicon-wafers/rfsi-wafers-high-resistivity-line-for-rf/uf-rfsi-ultra-flat-high-resistivity-silicon-wafer/.

Okmetic, UF-RFSi—Ultra Flat High Resistivity wafers, The Wayback Machine, May 22, 2022, 10 pages, https://web.archive.org/web/20220522170103/https://www.okmetic.com/silicon-wafers/rfsi-wafers-high-resistivity-line-for-rf/uf-rfsi-ultra-flat-high-resistivity-silicon-wafer/.

Philippe et al., Improvement of linearity in trap-rich substrates for radio frequency applications: Which of donor and acceptor trap is the best?, J. Appl. Phys. 136, 015702 (2024), Jul. 2, 2024, 15 pages, doi: 10.1063/5.0205853.

Soitec, Connect RFeSI SOI, Nov. 7, 2024, 3 pages, https://www.soitec.com/en/products/rfesi-soi.

* cited by examiner

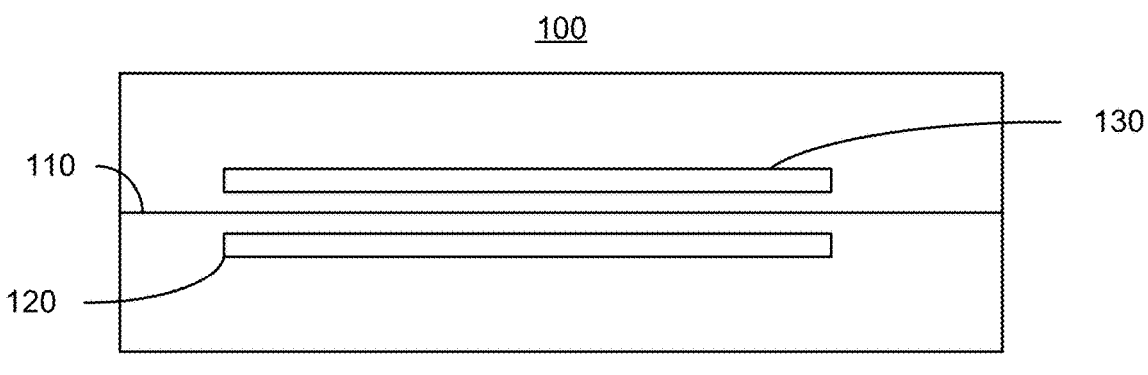
FIG. 1A
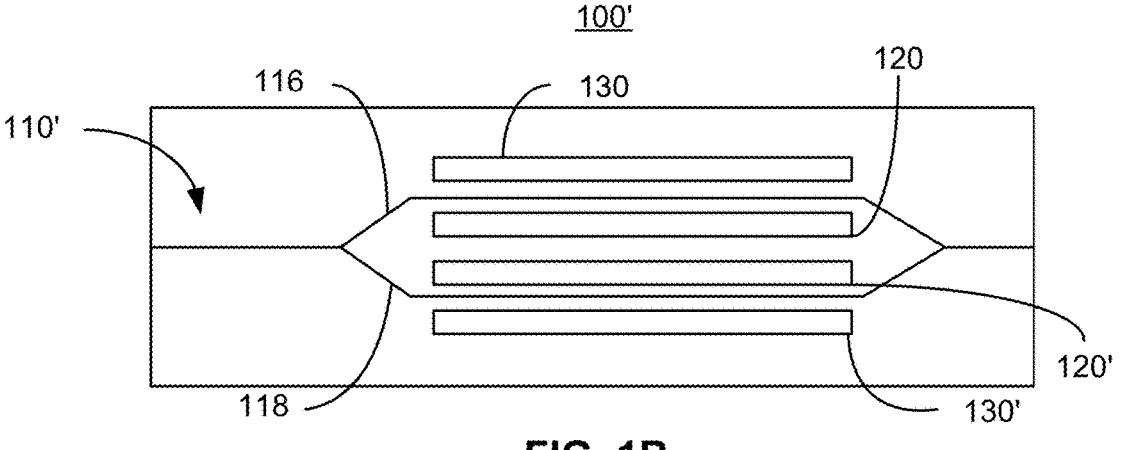
FIG. 1B
FIG. 1C

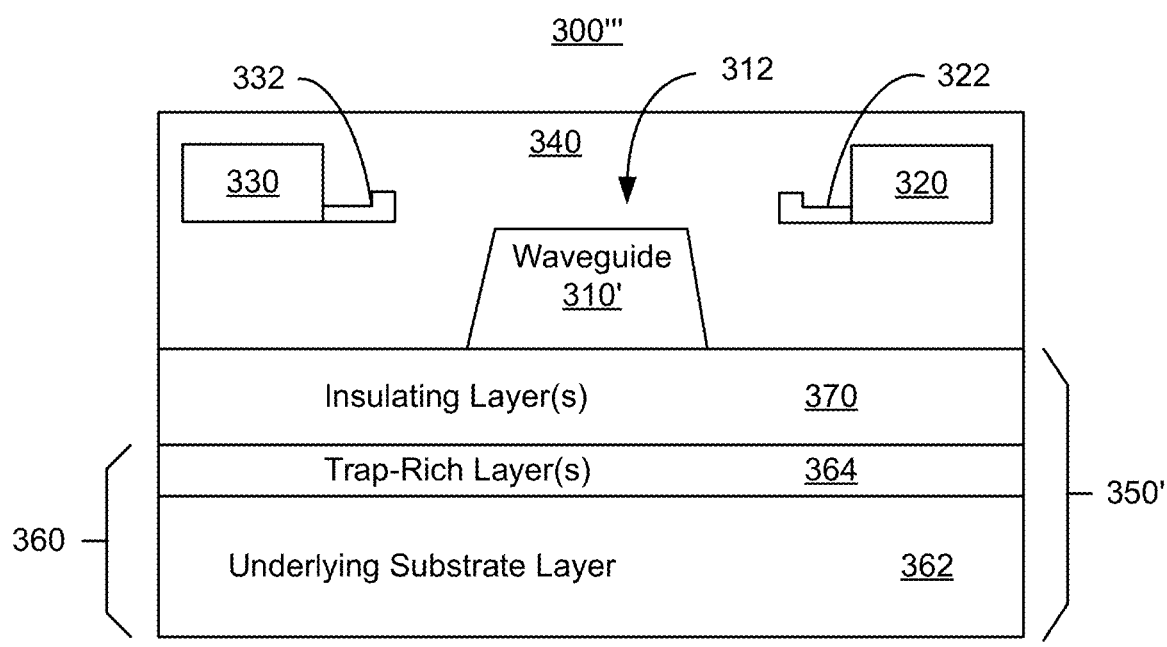
FIG. 3D
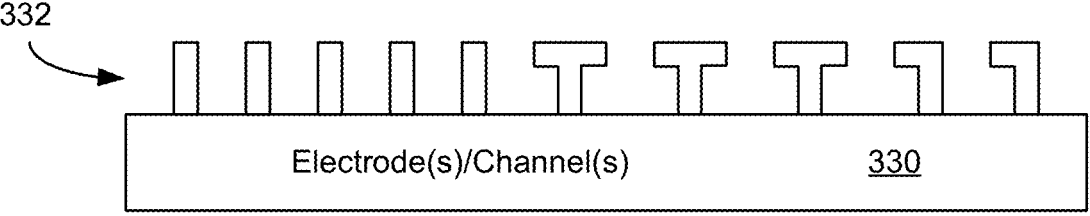
FIG. 3E
FIG. 4A

400'

500

600

612

Substrate     670

Insulating Layer(s)

650

| Optional Dielectric Layer(s) | 680 |
| Trap-Rich Layer(s) | 664 |
| Underlying Substrate Layer | 662 |

660

600

650

660

| Substrate | 612 |
| Insulating Layer(s) | 670 |
| Optional Dielectric Layer(s) | 680 |
| Trap-Rich Layer(s) | 664 |
| Underlying Substrate Layer | 662 |

600

600

600

700

700

700

800

800

800

Figure 9C:
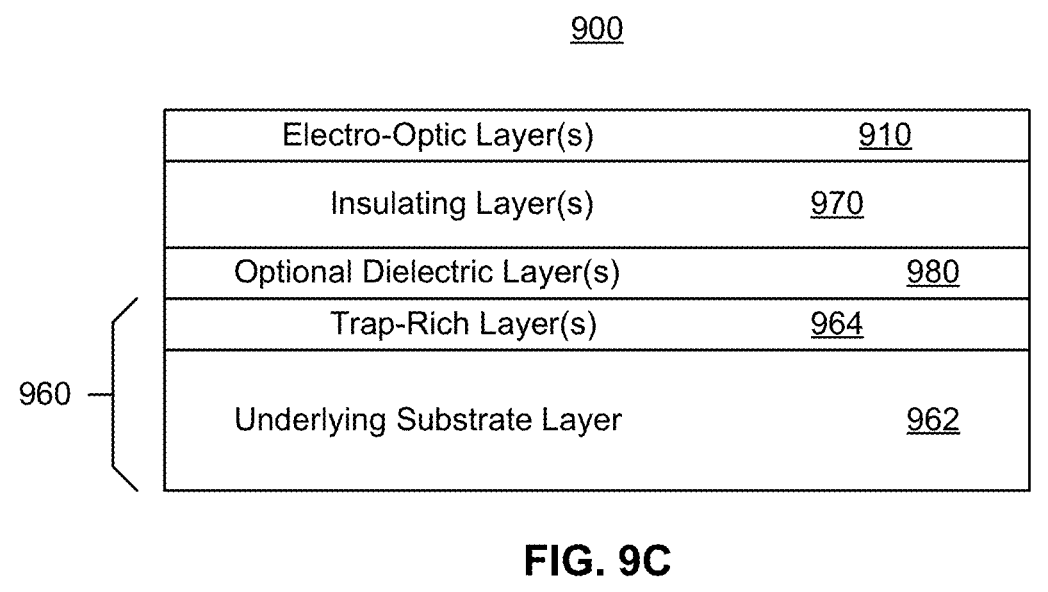

900

| | |
|---|---|
| Electro-Optic Layer(s) | 910 |
| Insulating Layer(s) | 970 |
| Optional Dielectric Layer(s) | 980 |
| Trap-Rich Layer(s) | 964 |
| Underlying Substrate Layer | 962 |

THIN FILM LITHIUM-CONTAINING PHOTONICS WAFER HAVING A TRAP-RICH SUBSTRATE

CROSS REFERENCE TO OTHER APPLICATIONS

This application claims priority to U.S. Provisional Patent Application No. 63/548,138 entitled THIN FILM LITHIUM-CONTAINING PHOTONICS WAFER HAV-ING A TRAP RICH SUBSTRATE filed Nov. 10, 2023 which is incorporated herein by reference for all purposes.

BACKGROUND OF THE INVENTION

Lithium-containing thin film electro-optic (TFEO) materials may include thin film lithium niobate (TFLN) and thin film lithium tantalate (TFLT). TFEO materials that contain lithium may have a large modulation in the index of refraction for a given applied electric field. Further, thin film lithium-containing (TFLC) materials may also provide a very high bandwidth for operation of the TFLC electro-optic device. Consequently, TFLC materials are desired to be used in electro-optic devices.

Although TFLC materials may improve performance of electro-optic devices, challenges persist. For example, radio frequency (RF) losses may be a significant fraction of the losses for the electro-device. Consequently, TFLC electro-optic devices are tailored to attempt to reduce RF losses over a wide bandwidth. For example, electrodes may be engi-neered to have lower RF losses. In some cases, performance of the TFLC electro-optic device may be limited by RF losses in the underlying substrate. To improve RF losses, substrates such as quartz or fused silica may be used. However, such substrates have limitations in thermal con-ductivity, wafer handling, yield, and process complexity. Consequently, techniques for reducing losses in TFLC elec-tro-optic devices are desired.

BRIEF DESCRIPTION OF THE DRAWINGS

Various embodiments of the invention are disclosed in the following detailed description and the accompanying draw-ings.

FIGS. 1A-1D depict embodiments of electro-optic devices having a trap-rich substrate structure.

FIGS. 3A-3E depict embodiments of electro-optic devices having a trap-rich substrate structure and engineered elec-trodes.

FIGS. 4A-4B depict embodiments of substrates usable for electro-optic devices.

FIGS. 9A-9C depict an embodiment of a substrate for electro-optic devices having a trap-rich substrate structure during fabrication.

DETAILED DESCRIPTION

Figure 1D:
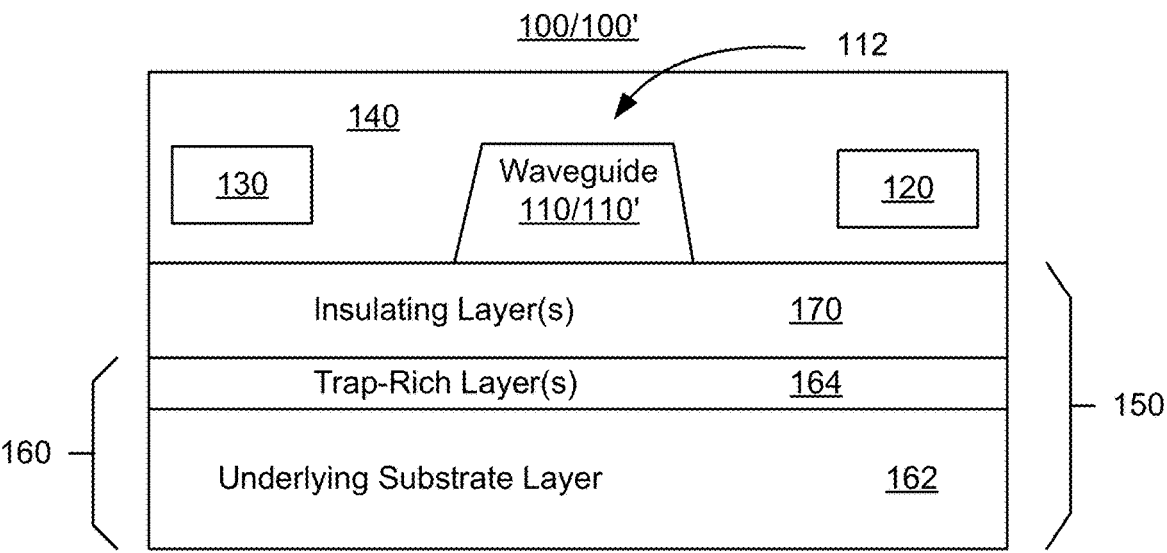

The invention can be implemented in numerous ways, including as a process; an apparatus; a system; a composi-tion of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as tech-niques. In general, the order of the steps of disclosed processes may be altered within the scope of the invention. Unless stated otherwise, a component such as a processor or a memory described as being configured to perform a task may be implemented as a general component that is tem-porarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying fig-ures that illustrate the principles of the invention. The invention is described in connection with such embodi-ments, but the invention is not limited to any embodiment. The scope of the invention is limited only by the claims and the invention encompasses numerous alternatives, modifi-cations and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The basic elements of electro-optic devices (also termed optical devices), such as electro-optic modulators, include waveguides and electrodes around the waveguides. The waveguide carries an optical signal. The electrodes are used to generate an electric field, or voltage difference, at or near the waveguide. This electric field causes a change in the index of refraction of the waveguide, which results in the optical signal being modulated. For example, an electrode signal (e.g. a microwave signal) may be applied to the electrodes. Thus, the electrodes may act as transmission lines. In a traveling wave modulator, the electrode signal travels in the same direction as the optical signal propagat-ing through the waveguide. The electrode signal generates a corresponding electric field at the waveguide, modulating the index of refraction of the waveguide. Therefore, the optical signal is modulated as the optical signal travels through the waveguide. Thus, the desired modulation of the optical signal may be achieved by driving the appropriate electrode signal through electrodes.

Many technologies have been proposed to improve opti-cal modulators. For example, thin film lithium-containing (TFLC) electro-optic materials may include thin film lithium niobate (TFLN) and thin film lithium tantalate (TFLT). TFLC materials may have a large modulation in the index of refraction for a given applied electric field. Further, TFLC materials may also provide a very high bandwidth for operation of the TFLC electro-optic device. Consequently, TFLC materials are desired to be used in electro-optic devices. However, TFLC electro-optic devices and other technologies may suffer significant drawbacks. For example, some modulators may be unable to provide the desired modulation at low to moderate voltages and/or may suffer from unacceptable microwave or optical signal losses. A single limiting factor in performance of an optical modulator may prevent the optical modulator from functioning as desired. For example, unacceptable electrode (e.g. radio frequency (RF) or microwave) losses may render the modulator unusable even if the electrodes can be driven at low voltages. For TFLC materials, RF losses may be a significant fraction of the losses for wide bandwidth devices. In some cases, performance of the TFLC electro-optic device may be limited by microwave losses due to the underlying substrate. To improve RF losses, substrates such as quartz or fused silica may be used. However, such substrates may have drawbacks in thermal conductivity, wafer handling, yield, and process complexity. Consequently, a mechanism for providing an optical modulator having low optical signal losses, low electrode (e.g. RF) losses, and/or providing the desired optical modulation at lower voltages while maintaining manufacturability and robustness is still desired.

A substrate configured for an electro-optic device formed using the substrate is described. The substrate includes a semiconductor substrate, an insulating layer, and at least one thin film optical material. The semiconductor substrate includes a trap-rich layer and an underlying substrate layer. The insulating layer is on the semiconductor substrate, The trap-rich layer is between the underlying substrate layer and the insulating layer. The trap-rich layer may include amorphous silicon and/or polysilicon. The thin film optical material(s) have an electro-optic effect and are on the insulating layer. In some embodiments, the thin film electro-optic material(s) include lithium. For example, the thin film electro-optic material(s) may include lithium niobate and/or lithium tantalate.

In some embodiments, the insulating layer has a thickness of at least two micrometers. In some embodiments, the thickness of the insulating layer may be at least three micrometers or at least five micrometers. Further, the insulating layer may have a thickness variation of less than ten percent of the thickness. In some embodiments, the insulating layer has a thickness variation of less than five hundred nanometers across the insulating layer.

The substrate may include a dielectric layer between the insulating layer and the trap-rich layer. In some embodiments, the insulating layer is at least two micrometers thick and has a thickness variation of less than five hundred nanometers across the insulating layer.

In some embodiments, the insulating layer is wafer bonded to the semiconductor substrate. For example, the insulating layer may be bonded to the dielectric layer or to the trap-rich layer.

An electro-optic device is described. The electro-optic device includes a waveguide and an electrode. The waveguide includes one or more thin film electro-optic layers and electrode(s). The waveguide and the electrode(s) are on a substrate structure. The substrate structure includes a semiconductor substrate and an insulating layer. The semiconductor substrate includes a trap-rich layer and an underlying substrate layer. The insulating layer is on the semiconductor substrate. The trap-rich layer is between the underlying substrate layer and the insulating layer. The trap-rich layer may include at least one of amorphous silicon or polysilicon. The thin film electro-optic layer(s) are on the insulating layer. In some embodiments, the thin film electro-optic layer(s) include lithium. For example, lithium niobate and/or lithium tantalate may be in the thin film electro-optic layer(s). The insulating layer has a thickness of at least two micrometers. In some embodiments, the insulating layer has a thickness variation of less than ten percent and/or the thickness variation of less than five hundred nanometers across the insulating layer. A dielectric layer may be between the insulating layer and the trap-rich layer. The dielectric layer may be deposited on the trap-rich layer.

In some embodiments, the insulating layer is at least two micrometers thick and has at least one of a thickness variation of less than five hundred nanometers across the insulating layer or the thickness variation of less than ten percent. In some embodiments, the insulating layer is wafer bonded to the semiconductor substrate. For example, the insulating layer may be bonded to the dielectric layer or to the trap-rich layer.

A method is described. The method includes affixing an insulating layer to or depositing the insulating layer on a semiconductor substrate. The semiconductor substrate includes a trap-rich layer and an underlying substrate layer. The trap-rich layer is between the underlying substrate layer and the insulating layer. The method also includes providing thin film optical material(s) having an electro-optic effect such that the insulating layer is between the at least one thin film optical material and the trap-rich layer. In some embodiments, the insulating layer has a thickness variation of less than ten percent and/or the thickness variation of less than five hundred nanometers across the insulating layer. In some embodiments, a dielectric layer is provided between the insulating layer and the trap-rich layer.

The embodiments described herein may include various features. One or more of these features may be combined in manner not explicitly described herein.

FIGS. 1A-1D depict embodiments of electro-optic devices 100 and 100' utilizing a substrate structure 150 that may have reduced microwave losses. FIG. 1A depicts a plan view of electro-optic device 100 including waveguide 110 and electrodes 120 and 130. The optical signal carried by waveguide 110 is modulated by the electrode signal in electrodes 120 and 130. In some embodiments, therefore, electrodes 120 and/or 130 carry a radio frequency (RF), or microwave, signal. FIG. 1B depicts electro-optic device 100' including waveguide 100' and electrodes 120, 130, 120', and 130'. Waveguide 110' and electrodes 120 and 130 and 120' and 130' are analogous to waveguide 110 and electrodes 120 and 130. Waveguide 100' includes two arms 116 and 118, which are modulated by electrode signals in electrodes 120 and 130 and electrodes 130' and 130', respectively. FIGS. 1C and 1D depict cross-sectional views of electro-optic devices 100 and/or 100'. For example, FIGS. 1C and 1D may depict waveguide 100 and electrodes 120 and 130 of electro-optic device 100 and/or arm 116 of waveguide 110' and electrodes 120 and 130 of electro-optic device 100'. FIGS. 1A-1D are not to scale.

Electro-optic devices 100 and 100' may be part of an optical modulator or other device with an electro-optic response (e.g. in picometers per volt) in the thin film plane (e.g. x-cut or y-cut lithium niobate) or perpendicular to the thin film plane. As used herein, an x-cut or y-cut modulator is one which has an electro-optic effect in the thin film plane (e.g. even if materials such as lithium niobate are not used). Other configurations are possible. For example, electro-optic devices having a different number of waveguides, other and/or additional waveguide components such as splitters and branches, and/or a different number of electrodes are possible. In one embodiment, an electro-optic device may be part of an optical modulator with an electro-optic response (e.g. in picometers per volt) out of plane of the thin film plane (e.g. z-cut lithium niobate). As used herein, a z-cut optical modulator has an electro-optic effect out of (e.g. perpendicular to) the thin film plane (e.g. even if materials such as lithium niobate are not used).

Referring to FIG. 1A, waveguide 110 is used to transmit optical signals. More specifically, waveguide 110 receives input optical signals and output modulated optical signals. Electrode(s) 120 and/or 130 carry an electrode signal that applies a time varying electric field to waveguide 110. In some embodiments, electrode 120 carries an electrode signal, such as a microwave signal, while electrode 130 is a ground. In some embodiments, electrode 130 carries an electrode (e.g. microwave) signal, while electrode 120 is ground. In some embodiments, both electrodes 120 and 130 carry electrode signals. Other configurations are also possible. The electric field generated by the electrode signal alters the index of refraction of waveguide 110. Thus, electrodes 120 and 130 combine with waveguide 110 to provide a modulated optical signal. Electrodes 120 and 130 are drawn around waveguide 110 to indicate that waveguide 110 experiences an applied electric field between 120 and 130, but does not indicate the physical locations of electrode 120 and 130. For example, it is possible to have electrode 120 directly on top or below the waveguide while 130 is on one side.

Electro-optic device 100' operates in a similar manner to electro-optic device 100. However, in electro-optic device 100', waveguide 110' splits into arms 116 and 118, each of which carries an optical signal. The optical signal in arm 116 is modulated by the electrode signal in electrodes 120 and 130, while the optical signal in arm 118 is modulated by the electrode signal in electrodes 120' and 130'.

Waveguides 110 and 110' each includes at least one optical material possessing an electro-optic effect. In some embodiments, waveguides 110 and 110' include thin film lithium containing (TFLC) electro-optic materials, such as TFLN and/or TFLT. In some embodiments, waveguides 110 and 110' consist of TFLN and/or TFLT. For example, the thickness of the electro-optic layer form which waveguides 110 and/or 110' are formed is not more than three micrometers prior to fabrication of waveguides 110 and/or 110'. In some embodiments, this thickness is not more than 1.5 micrometer or not more than one micrometer. In some embodiments, the thickness is not more than seven hundred nanometers or not more than five hundred nanometers. In some embodiments, the thickness is at least one hundred nanometers. Other thicknesses are possible. The thickness of waveguides 110 and/or 110' is less than or equal to the thickness of the as-provided electro-optic layer. For example, the thickness of waveguides 110 and/or 110' may be on the order of a few hundred nanometers or less.

In some embodiments, the optical material(s) used in waveguide(s) 110 and/or 110' are nonlinear. As used herein, a nonlinear optical material exhibits the electro-optic effect and has an effect that is at least (e.g. greater than or equal to) 5 picometer/volt. In some embodiments, the nonlinear optical material has an effect that is at least 10 picometer/volt. In some such embodiments nonlinear optical material has an effect of at least 20 picometer/volt. The nonlinear optical material experiences a change in index of refraction in response to an applied electric field. In some embodiments, the nonlinear optical material is ferroelectric. In some embodiments, the electro-optic material effect includes a change in index of refraction in an applied electric field due to the Pockels effect. Thus, in some embodiments, optical materials possessing the electro-optic effect in one or more the ranges described herein are considered nonlinear optical materials regardless of whether the effect is linearly or nonlinearly dependent on the applied electric field. The nonlinear optical material may be a non-centrosymmetric material. Therefore, the nonlinear optical material may be piezoelectric. Such nonlinear optical materials may have inert chemical etching reactions for conventional etching using chemicals such as fluorine, chlorine or bromine compounds. In some embodiments, the nonlinear optical material(s) include one or more of LN, LT, potassium niobate, gallium arsenide, potassium titanyl phosphate, lead zirconate titanate, and barium titanate. In other embodiments, other nonlinear optical materials having analogous optical characteristics may be used.

In some embodiments, waveguides 110 and 110' are low optical loss waveguides. For example, waveguides 110 and 110' may each have a total optical loss of not more than 10 dB through the portion of waveguide 110/110' (e.g. when biased at maximum transmission and as a maximum loss) in proximity to electrodes 120/120' and 130/130'. The total optical loss is the optical loss in a waveguide through a single continuous electrode region (e.g. as opposed to multiple devices cascaded together). In some embodiments, waveguides 110 and/or 110' has a total optical loss of not more than 8 dB. In some embodiments, the total optical loss is not more than 4 dB. In some embodiments, the total optical loss is less than 3 dB. In some embodiments, the total optical loss is less than 2 dB. In some embodiments, waveguides 110 and/or 110' has an optical loss of not more than 3 dB/cm (e.g. on average). In some embodiments, the nonlinear material(s) in waveguides 110 and/or 110' has an optical loss of not more than 2.0 dB/cm. In some such embodiments, waveguide 110 and/or 110' has an optical loss of not more than 1.0 dB/cm. In some embodiments, waveguide 110 and/or 110' has an optical loss of not more than 0.5 dB/cm. In some embodiments, the low optical losses are associated with a low surface roughness of the side walls of waveguides 110 and/or 110'.

Waveguide 110 and/or 110' may have improved surface roughness. For example, the short range root mean square surface roughness of a sidewall of the ridge 112 may be less than ten nanometers. In some embodiments, this root mean square surface roughness is not more than five nanometers. In some cases, the short range root mean square surface roughness does not exceed two nanometers. In some embodiments, the height of ridge 112 is selected to provide a confinement of the optical mode such that there is a 10 dB reduction in intensity from the intensity at the center of ridge 112 at ten micrometers from the center of ridge 112. For example, the height of ridge 112 is on the order of a few hundred nanometers in some cases. However, other heights are possible in other embodiments.

Various other optical components may be incorporated into waveguide 110 and/or 110' to provide the desired phase modulation, polarization modulation, intensity modulation, IQ modulation, other modulation and/or other functionality. For example, waveguide 110 and/or 110' may have wider portion(s) (not shown in FIGS. 1A-1D) for accommodating multiple modes. In some embodiments (not shown in FIGS. 1A-1D), waveguide 110 and/or 110' may include splitters to divide the optical signal into multiple branches for modulation and recombine the modulated optical signals for output. Thus, waveguide 110 and/or 110', as well as electrodes 120, 120', 130 and 130', may be configured to provide the desired functionality.

FIG. 1C depicts a cross-sectional view of a portion of electro-optic device(s) 100 and/or 100'. Thus, in addition to electrodes 120 and 130 and waveguide 110/110', cladding 140 and substrate 150 are shown. Substrate 150 includes a semiconductor substrate 160 and insulating layer 170. Waveguide 110 is shown as having a ridge portion 112 and a slab portion 114. Electrodes 120 and 130 are shown as located a particular distance from insulating layer 170. In other embodiments, electrodes 120 and/or 130 may be located closer to or further form insulating layer 170. For example, electrodes 120 and/or 130 may reside directly on slab 114 or may be located such that the bottom of electrodes 120 and/or 130 is not lower than the top of ridge 112. In the embodiment shown, the optical mode is well confined to ridge 112. Slab 114 may aid in directing electric field due to the RF electrode signal carried by electrodes 120 and/or 130 toward the optical mode carried by ridge 112.

FIG. 1D depicts a cross-sectional view of a portion of electro-optic device(s) 100 and/or 100' that is analogous to the electro-optic device depicted in FIG. 1C. However, waveguide 110/110' may have a different structure. In the embodiment shown in FIG. 1D, waveguide 110/110' consists of the ridge 112 only. Thus, the slab portion is omitted. For example, the electro-optic layer from which waveguide 110/110' may be etched through in regions away from ridge 112. Electrodes 120 and 130 are configured in an analogous manner in FIGS. 1C and 1D. For example, electrodes 120 and/or 130 may be located closer to or further form insulating layer 170.

Electro-optic devices 100 and 100' utilize substrate 150 that includes a semiconductor substrate 160 and an insulating layer 170. Semiconductor substrate 160 may be a silicon substrate. Further, semiconductor substrate 160 includes a trap-rich layer 164 on an underlying substrate layer 162. In some embodiments, underlying substrate layer 162 may be or include high resistivity silicon. For example, underlying substrate layer 162 may have a resistivity of at least one kilo Ohm, at least three kilo Ohms, at least five kilo Ohms, at least seven kilo Ohms, or at least ten kilo Ohms. In some embodiment, underlying substrate layer 162 may be at least one hundred micrometers and not more than one millimeter.

Trap-rich layer 164 may be a trap-rich silicon layer. Trap-rich layer 164 may be formed by etching semiconductor substrate 160, laser texturing the surface of semiconductor substrate 160, and/or in another manner. For example, some techniques that may be used for achieving trap-rich layer may include inducing active defects via doping, chemical processing, laser irradiation, low pressure chemical vapor deposition (LPCVD) of trap rich layer 164, formation of open bonds at grain boundaries in amorphous or poly crystals, and/or trapped states in stress induced boundaries, and/or other techniques. Trap-rich layer 164 may be or include a polysilicon layer and/or amorphous layer. Thus, trap-rich layer 164 includes states within the bandgap that can trap free charges. For example, trap-rich layer 164 may include dangling electrical bonds that can capture electrons or holes. Trap-rich layer 164 is between insulating layer 170 and underlying semiconductor layer 162. In some embodiments, trap-rich layer 164 is at least one hundred nanometers thick and not more than six micrometers thick. In some embodiments, trap-rich layer 164 is not more than four micrometers thick. In some embodiments, trap-rich layer 164 is at least two hundred nanometers thick.

Insulating layer 170 may be or include a thermally grown oxide (e.g. silicon dioxide). In other embodiments, insulating layer 170 may be or include a deposited oxide. Thus, insulating layer 170 may be considered a buried oxide (BOX) layer. In some embodiments, insulating layer 170 is at least two micrometers thick. In some embodiments, insulating layer 170 is at least three micrometers thick. Insulating layer 170 may be at least five micrometers thick. In some embodiments, insulating layer 170 is up to ten micrometers or fifteen micrometers thick. Further, the variation in thickness of insulating layer 170 may be small. The variation in thickness of insulating layer 170 may be not more than ten percent. In some embodiments, the variation in thickness of insulating layer 170 is not more than five percent. This variation in thickness may be not more than three percent. In some embodiments, the variation in thickness of insulating layer 170 is not more than one percent. For example, in some embodiments, insulating layer 170 has a thickness variation of less than five hundred nanometers across the insulating layer. In some embodiments, this variation in thickness is not more than three hundred nanometers.

Electro-optic devices 100 and/or 100' in which waveguide 110 and/or 110' includes or consists of electro-optic materials such as LN and/or LT may have improved performance. For example, waveguides 110 and/or 110' may be low loss and capable of use for a large bandwidth (e.g. providing the desired modulation in frequency ranges from at or near DC to at least 500 GHz). Further, electro-optic devices 100 and/or 100' may have lower microwave losses. In particular, substrate structure 150 may reduce microwave losses.

Thick insulating layer 170 may be desirable for improved performance of waveguides 110 and/or 110' that use TFLC optical materials. In addition, insulating layer 170 may have a low variation in thickness. A high thickness and good uniformity facilitate consistent high performance of TFLN and TFLT waveguides 110 and/or 110'. For example, insulating layer 170 may be a silicon dioxide layer that has the thicknesses (e.g. a minimum thickness of two micrometers) and the uniformity described herein. In some embodiments, such as for advanced devices, insulating layer 170 is a silicon dioxide layer that is even thicker (e.g. a minimum thickness of five micrometers or ten micrometers). This thickness in combination with the described uniformity for photonics devices, particularly those including TFLC waveguides, is in contrast to substrates having trap-rich layers that are used for conventional applications. Such substrates typically use a silicon dioxide layer having a thickness of less than five hundred nanometers. Hence integration of substrate structure 150 for photonic applications is not straightforward. For example, typical processes, such as thermal oxidation of semiconductor substrate 160 that forms a thermal oxide on TR layer 164 cannot be used for producing thick insulating layer 170. Consequently, other techniques, such as those described herein (e.g. wafer bonding of some or all of the insulating layer), may be used.

Thus, optical performance of electro-optic devices 100 and/or 100' may be improved.

Substrate structure 150 may also contribute to the reduction in microwave losses. Thick insulating layer 170 may be formed by thermally oxidizing a silicon (e.g. a high resistivity silicon) substrate. However, oxidized high-resistivity silicon may suffer from parasitic surface conduction (PSC). PSC may be due to the presence of fixed charges at or near the Si—SiO2 interface that attract free charge carriers. The free charges may reduce the effective resistivity of the substrate by more than an order of magnitude from its nominal value measured in bulk. The reduction in resistivity can result in higher RF losses. Thus, without more, the use of a thick insulating layer may result in free charges in a substrate that may significantly contribute to the RF loss.

However, in a trapped state, such free charges just induce local dipoles. Thus, trap-rich layer 164 is used between insulating layer 170 and underlying (e.g. high resistivity silicon) substrate layer 162. Trap-rich layer 164 has a higher density of traps (e.g. higher than underlying semiconductor substrate layer 162). Consequently, free charges may be more likely to be trapped and be unavailable for contributing to RF losses. For example, in some embodiments, microwave losses may be improved by at least ten percent and by up to fifty percent. In some embodiments, pure poly-silicon is used for trap-rich layer 164. In some such embodiments, no additional dopants that may cause further RF losses are used. Thus, trap-rich layer 164 of semiconductor substrate 160 may reduce RF losses and crosstalk. Moreover, linearity may be improved and DC dependency reduced or eliminated. Further, semiconductor substrate 160 may have superior mechanical properties of silicon, while reducing microwave losses because of the presence of trap-rich layer 164. Consequently, substrate structure 150 may improve performance, reliability, and yield of electro-optic devices 100 and/or 100'.

Thus, in addition to low optical losses and high modulation for a given electric field, electro-optic devices 100 and/or 100' may have reduced microwave losses. Consequently, performance of electro-optic devices 100 and/or 100' may be enhanced.

Figure 2A:
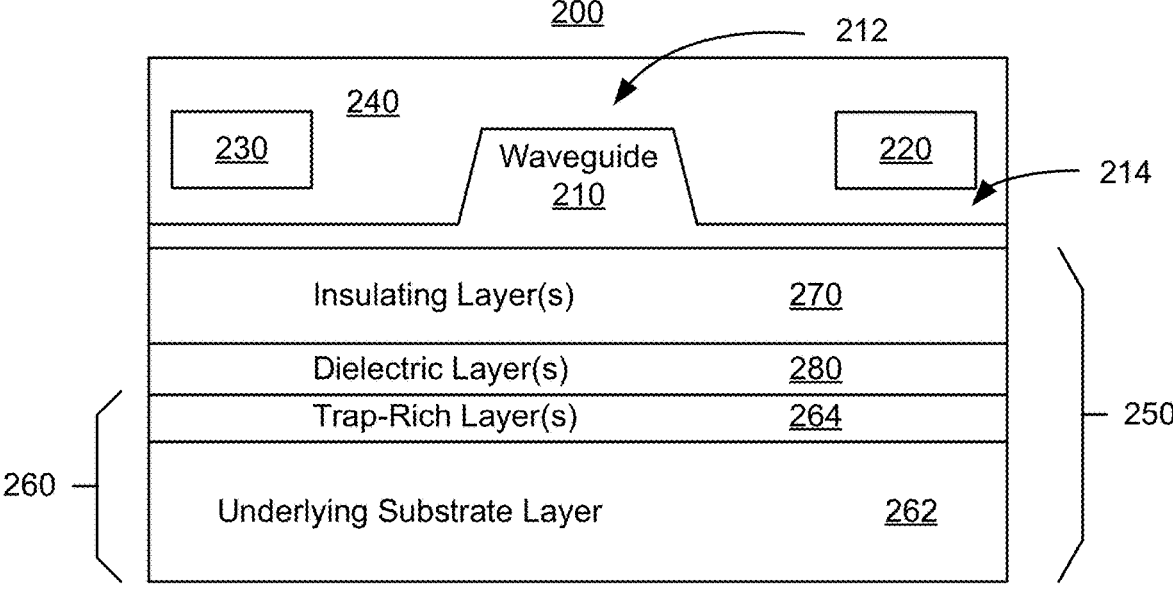
FIGS. 2A-2B depict embodiments of electro-optic devices having a trap-rich substrate structure.
Figure 2B:
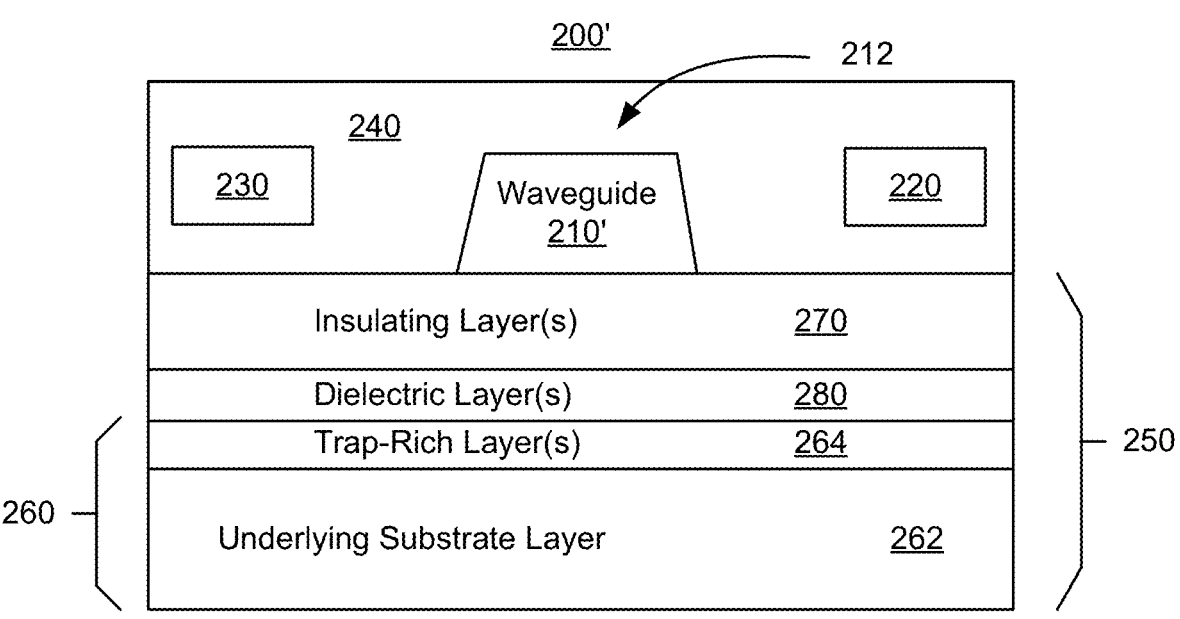

FIGS. 2A-2B depict cross-sectional views of embodiments of electro-optic devices 200 and 200' for which microwave losses may be mitigated. FIGS. 2A-2B are not to scale. Electro-optic devices 200 and 200' are analogous to electro-optic devices 100 and 100'. Consequently, analogous components are labeled similarly. Electro-optic device 200 includes waveguide 210 having ridge 212 and slab 214, electrodes 220 and 230, cladding 240, and substrate structure 250 including insulating layer 270 and semiconductor substrate 260 having trap-rich layer(s) 264 and underlying substrate layer 262 that are analogous to waveguide 110/110' having ridge 112 and slab 114, electrodes 120/120' and 130/130', cladding 140, and substrate structure 150 including insulating layer 170 and semiconductor substrate 160 having trap-rich layer(s) 164 and underlying substrate layer 162. Similarly, electro-optic device 200' includes waveguide 210' having ridge 212, electrodes 220 and 230, cladding 240, and substrate structure 250 including insulating layer 270 and semiconductor substrate 260 having trap-rich layer(s) 264 and underlying substrate layer 262 that are analogous to waveguide 110/110' having ridge 112, electrodes 120/120' and 130/130', cladding 140, and substrate structure 150 including insulating layer 170 and semiconductor substrate 160 having trap-rich layer(s) 164 and underlying substrate layer 162.

In addition, electro-optic devices 200 and 200' include dielectric layer(s) 280. In some embodiments, dielectric layer(s) 280 are deposited dielectrics. For example, silicon dioxide, a nitride, another oxide, and/or another insulator may be deposited on semiconductor substrate 260. In some embodiments, dielectric layer(s) 280 may be multilayers. Dielectric layer 280 may have a thickness that is less than 5 micrometers. In some embodiments, dielectric layer 280 is less than 3 micrometers thick. Dielectric layer 280 may be less than 1 micrometer thick or less than five hundred nanometers thick. The thickness of dielectric layer(s) 280 may be less than two hundred nanometers or less than one hundred nanometers in some embodiments. The-variation in thickness of dielectric layer(s) 280 may be less than one micrometer. In some embodiments, this thickness variation is less than five hundred nanometers or less than two hundred nanometers. In some embodiments, the thickness variation of dielectric layer(s) 280 is less than one hundred nanometers.

Electro-optic devices 200 and/or 200' may share the benefits of electro-optic devices 100 and/or 100' electro-optic devices. Waveguides 210 and/or 210' including or consisting of electro-optic materials such as LN and/or LT may have improved performance. For example, waveguides 210 and/or 210' may be low loss and capable of use over a large bandwidth. Further, electro-optic devices 200 and/or 200' may have lower microwave losses due to the presence of trap-rich layers 264. Insulating layer 270 also aids in reducing the microwave losses of electro-optic devices 200 and/or 200'. Consequently, performance of electro-optic devices 200 and/or 200' may be enhanced.

Figure 3A:
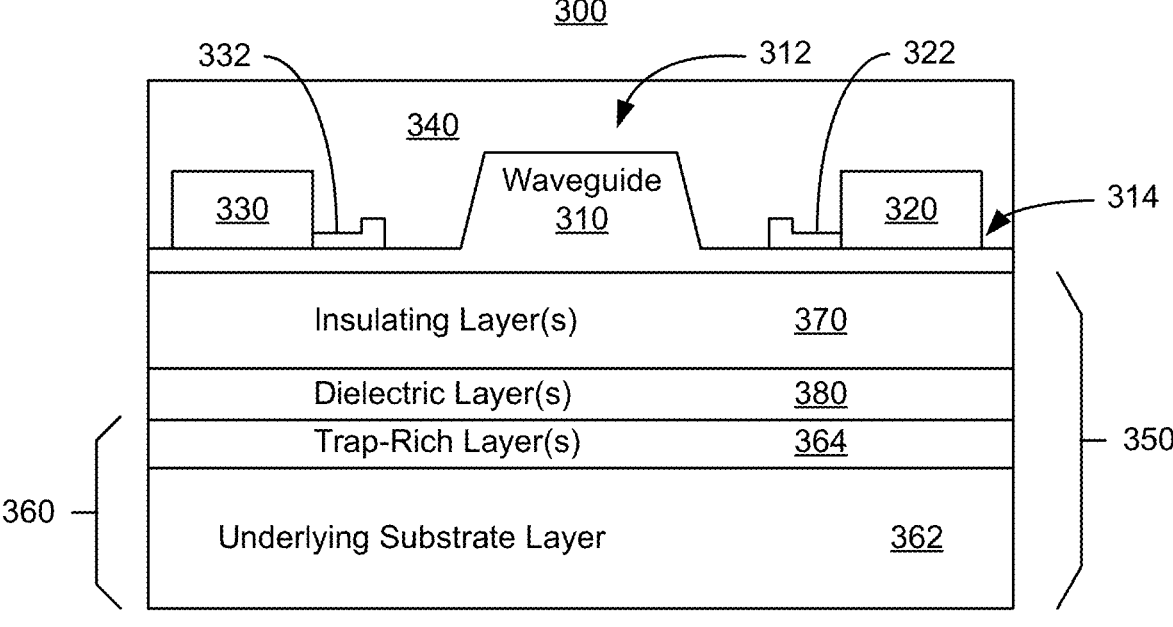
Figures 3B, 3C:
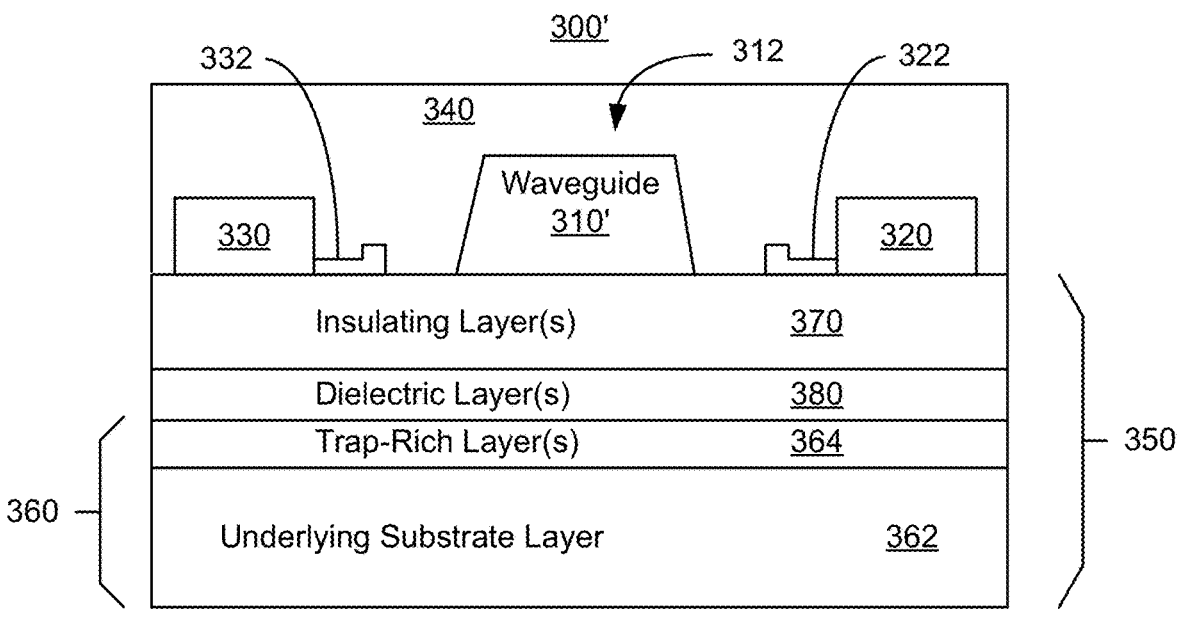

FIGS. 3A-3E depict embodiments of electro-optic devices 300, 300', 300'' and 300''' that may have reduced microwave losses. FIGS. 3A-3D depict cross-sectional views of optical devices 300, 300', 300'', and 300''', while FIG. 3E depicts a plan view of an electrode 330. FIGS. 3A-3E are not to scale. Electro-optic devices 300, 300', 300'', and 300''' are analogous to electro-optic devices 100, 100', 200, and 200'. Consequently, analogous components are labeled similarly. Electro-optic devices 300 and 300'' include waveguide 310 having ridge 312 and slab 314, electrodes 320 and 330, cladding 340, and substrate structure 350 or 350' including insulating layer 370 and semiconductor substrate 360 having trap-rich layer(s) 364 and underlying substrate layer 362 that are analogous to waveguide 110/110' having ridge 112 and slab 114, electrodes 120/120' and 130/130', cladding 140, and substrate structure 150 including insulating layer 170 and semiconductor substrate 160 having trap-rich layer(s) 164 and underlying substrate layer 162. Similarly, electro-optic devices 300' and 300''' each includes waveguide 310' having ridge 312, electrodes 320 and 330, cladding 340, and substrate structure 350 or 350' including insulating layer 370 and semiconductor substrate 360 having trap-rich layer(s) 364 and underlying substrate layer 362 that are analogous to waveguide 110/110' having ridge 112, electrodes 120/120' and 130/130', cladding 140, and substrate structure 150 including insulating layer 170 and semiconductor substrate 160 having trap-rich layer(s) 164 and underlying substrate layer 162. Further, electro-optic devices 300' and 300'' include dielectric layer(s) 380 of substrate structures 350' that are analogous to dielectric layer(s) 280 of substrate structures 250. Electro-optic devices 300, 300', 300'', and 300'' also indicate that electrodes 320 and 330 may reside at various distances from substrate structure 350. For example, electrodes 320 and 330 of electro-optic device 300 are on and in contact with slab 314. Electrodes 320 and 330 of electro-optic device 300' are on and in contact with insulating layer 370. Electrodes 320 and 330 of electro-optic device 300'' have intervening dielectric (e.g. a portion of cladding 340) between electrodes 320 and 330 and the underlying slab 314. Electrodes 320 and 330 of electro-optic device 300'' have intervening dielectric (e.g. a portion of cladding 340) between electrodes 320 and 330 and the underlying insulating layer 370. Further electrodes 320 and 330 of electro-optic device 300''' are at or above the height of waveguide 310'. Electrodes 320 and/or 330 may have other locations in other embodiments.

Electrodes 320 and 330 also include extensions 322 and 332, respectively. Analogous engineered electrodes are described in U.S. patent application Ser. No. 17/843,906 entitled ELECTRO-OPTIC DEVICES HAVING ENGINEERED ELECTRODES filed on Jun. 17, 2022, which is incorporated herein in its entirety for all purposes. As can be seen in FIGS. 3A-3D, in some embodiments, extensions 322 and 332 may vary in thickness.

Electrodes 320 and 330 may be considered channel regions while extensions 322 and 332 are thin conductive structures that extend toward waveguides 310 and/or 310'. Electrodes 320 and 330 together with extensions 322 and 332, respectively, may be considered to form an engineered electrode. Extensions 322 and 332 shown in FIG. 3E might be simple rectangular protrusions or may have a different shape such as the L-shaped footprint and T-shaped footprint shown in FIG. 3E. Although extensions 332 having different shapes for a single electrode 330 are shown, in some embodiments all extensions 322 and 332 for a particular electrode 320 and/or 330 have the same shape. The distribution (e.g. pitch) and width of extensions 322 and/or 33 may be irregular or regular (e.g. constant or increasing monotonically).

Extensions 322 and 332 protrude from channel regions/electrodes 320 and 330, respectively, and reside between channel regions/electrodes 320 and 330, respectively, and waveguide 310 and 310'. As a result, extensions 322 and 332 are sufficiently close to waveguide 310 and/or 310' to provide an enhanced electric field at waveguide 310 and/or 310'. Consequently, the change in index of refraction induced by the microwave signal in electrode(s) 320 and/or 330 is increased. Electrical charges have a reduced tendency to cluster at the edge of channel region/electrodes 320 and 330 closest to waveguide 310 and 310'. Consequently, current is more readily driven through channel regions/electrodes 320 and 330. Because microwave signal losses through electrodes 320 and 330 may be reduced, a smaller driving voltage may be utilized for electrode(s) 320 and/or 330 and less power may be consumed by optical device(s) 300, 300', 300", and/or 300'". Electrode(s) 320 and/or 330 and extensions 322 and/or 332 may be fabricated using deposition techniques, such as evaporation and/or electroplating, and photolithography.

Electro-optic devices 300, 300', 300", and/or 300'" may share the benefits of electro-optic devices 100, 100', 200, and/or 200'. Waveguides 310 and/or 310' including or consisting of electro-optic materials such as LN and/or LT may have low optical loss and be capable of use over a large bandwidth. Use of extensions 322 and 332 may reduce microwave losses, allow for a large electric field at waveguides 310 and/or 310' and improve the propagation of the microwave signal through electrodes 320 and/or 330. Further, electro-optic devices 300, 300', 300", and/or 300'" may have lower microwave losses due to the presence of trap-rich layers 364. Insulating layer 370 also aids in reducing the microwave losses of electro-optic devices 210 and/or 210'. Consequently, performance of electro-optic devices 300, 300', 300", and/or 300'" may be enhanced.

Figure 4B:
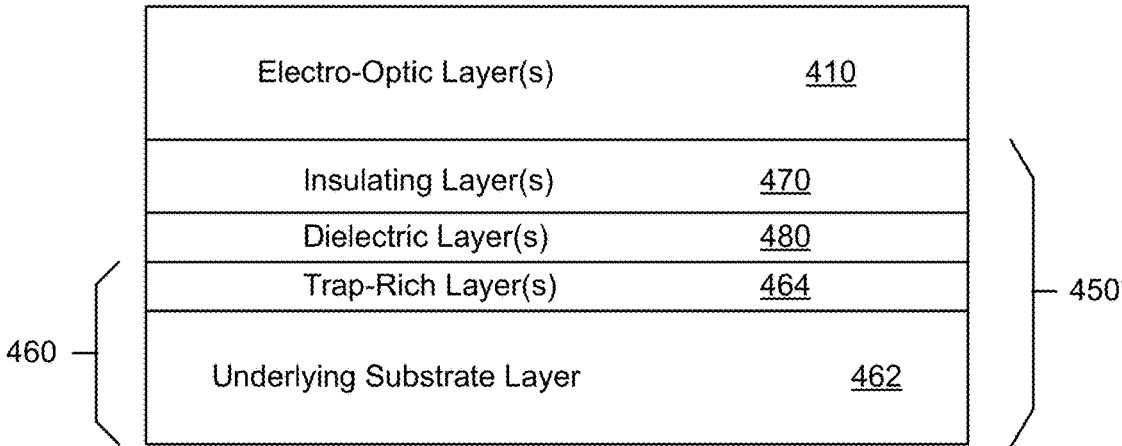

FIGS. 4A-4B depict embodiments of substrates 400 and 400' usable for electro-optic devices for which microwave losses may be mitigated. FIGS. 4A-4B are not to scale. Substrates 400 and 400' are analogous to those used for electro-optic devices 100, 100', 200, 200', 300, 300', 300", and/or 300'". Consequently, analogous components are labeled similarly. Substrate 400 includes substrate structure 450 including insulating layer 470 and semiconductor substrate 460 having trap-rich layer(s) 464 and underlying substrate layer 462 that are analogous to substrate structure 150 including insulating layer 170 and semiconductor substrate 160 having trap-rich layer(s) 164 and underlying substrate layer 162. Similarly, substrate 400' includes substrate structure 450' including insulating layer 470 and semiconductor substrate 460 having trap-rich layer(s) 464 and underlying substrate layer 462 that are analogous to substrate structure 150 including insulating layer 170 and semiconductor substrate 160 having trap-rich layer(s) 164 and underlying substrate layer 162. Substrate 400' also includes dielectric layer 480 that is analogous to dielectric layer 280. Dielectric layer 480 may be deposited on semiconductor substrate 460. Substrates 400 and 400' also include electro-optic layer(s) 410. Electro-optic layers 410, such as LN and/or LT, may be provided onto substrate structures 450 and 450'. For example, electro-optic layers 410 may be wafer bonded to substrate structures 450 and 450'. The electro-optic layers 410 may then be thinned to the desired thickness for fabrication of devices. For example, TFLN and/or TFLT waveguides and electrodes may be formed.

Using substrates 400 and/or 400', thin film electro optic devices may be formed. For example, electro-optic devices 100, 100', 200, 200', 300, 300', 300", and/or 300'" may be fabricated. Thus, the benefits described herein may be obtained. For example, low optical and low microwave losses may be achieved, fabrication of the electro-optic devices may be facilitated, and performance of the devices enhanced.

Figure 5:
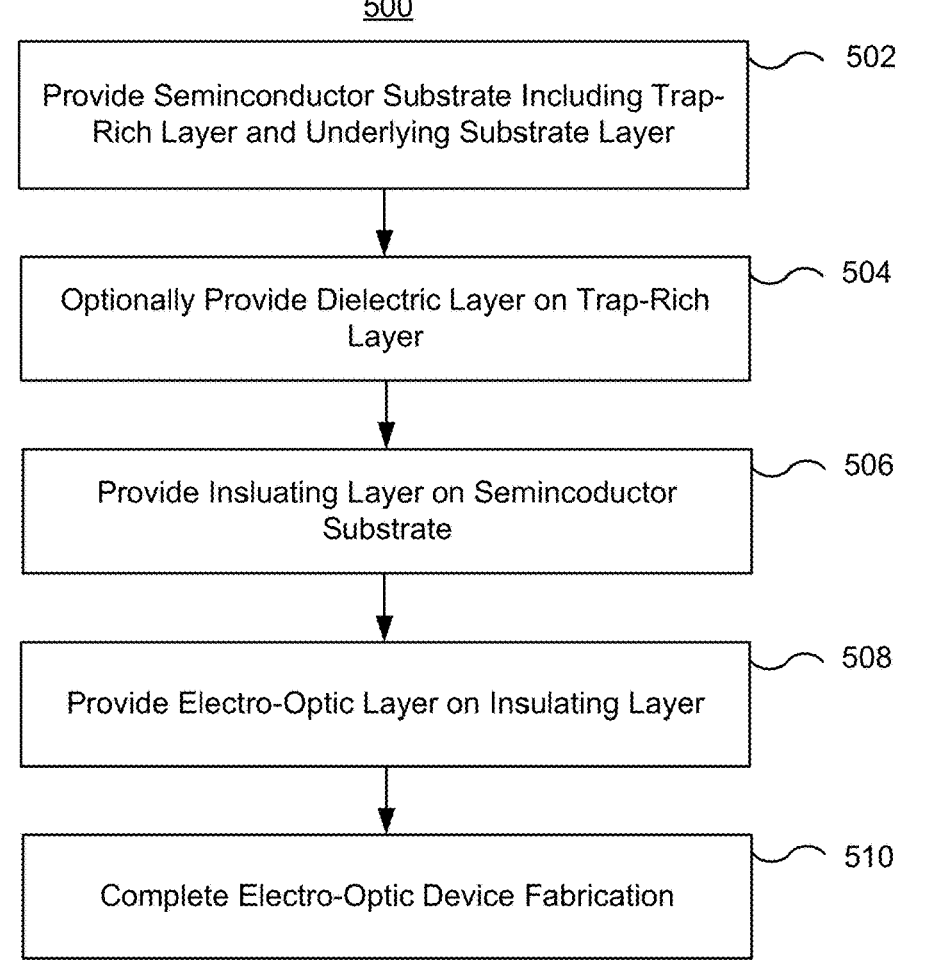
FIG. 5 is a flow chart depicting an embodiment of a method for fabricating an electro-optic device having a trap-rich substrate.

FIG. 5 is a flow chart depicting an embodiment of method 500 for fabricating an electro-optic device having a trap-rich substrate. Method 500 is described in the context of processes that may have sub-processes. Although described in a particular order, another order not inconsistent with the description herein may be utilized.

A semiconductor substrate that includes a trap-rich layer on an underlying substrate layer is provided, at 502. In some embodiments, 502 includes forming a polysilicon and/or amorphous layer on a high resistivity silicon substrate. For example, laser texturing the surface of semiconductor substrate, inducing active defects via doping, chemical processing, formation of open bonds at grain boundaries in amorphous or poly crystals, and/or formation trapped states in stress induced boundaries may be performed.

In some embodiments, a dielectric layer may be formed on the trap-rich layer, at 504. In some embodiments, the dielectric layer is deposited. For example, a layer of silicon dioxide, other oxides, nitrides, and/or other insulators may be deposited on the surface of the semiconductor substrate. The dielectric layer may have multiple layers of different dielectrics (e.g. a layer of silicon dioxide and a nitride layer). In some embodiments, the dielectric layer is thermally grown from the underlying polysilicon (e.g. trap-rich layer) below. However, in some embodiments, 504 may be omitted. For example, for a polysilicon trap-rich layer formed at 502, the dielectric layer of 504 may be omitted. In such embodiments, the trap-rich polysilicon layer may be used as a bonding surface.

An insulating layer is provided on the semiconductor substrate, at 506. In some embodiments, at least some of the insulating layer is a thermally grown dielectric such as silicon dioxide. In some such embodiments, the thermally grown insulating layer is grown on another substrate affixed to the semiconductor substrate (e.g. to the trap-rich layer or to the dielectric layer). For example, the insulating layer may be wafer bonded to the semiconductor substrate. In some embodiments, at least part of the insulating layer is deposited. For example, the insulating layer may be formed by depositing silicon dioxide on the semiconductor substrate. In some embodiments, a first portion of the insulating layer is deposited on the semiconductor substrate and another portion of the insulating layer is deposited on another substrate and then affixed to the semiconductor substrate (i.e. to the first portion of the insulating layer). Other techniques may be used to form the insulating layer at 506. In some embodiments, 506 is performed such that the insulating layer has the large thickness (e.g. greater than three micrometers) and low variation in thickness (e.g. less than ten percent or less than five percent) described herein.

The electro-optic layer is provided on the insulating layer, at 508. In some embodiments, the electro-optic layer (e.g. LN and/or LT) is bonded to the insulating layer. In some embodiments, the insulating layer is on the electro-optic layer and the combination is bonded to the semiconductor substrate. Also at 508, the electro-optic layer may be thinned to provide the desired thickness of the TFLC layer for fabrication of the electro-optic device. At 510, fabrication of the device is completed. For example, waveguides and other optical structures may be formed using the electro-optic layer and electrodes and/or other structures may be formed.

Using method 500, a substrate (e.g. via 502, 504, 506, and 508) and an electro-optic device (e.g. via 502, 504, 506, 508, and 510) may be fabricated. Thus, the benefits described herein may be achieved. FIGS. 6A-6E, FIGS. 7A-7C, FIGS. 8A-8C, and FIGS. 9A-9C depict devices 600, 700, 800, and 900 formed using method 500. Thus, various structures may be formed using method 500.

Figures 6A, 6B:
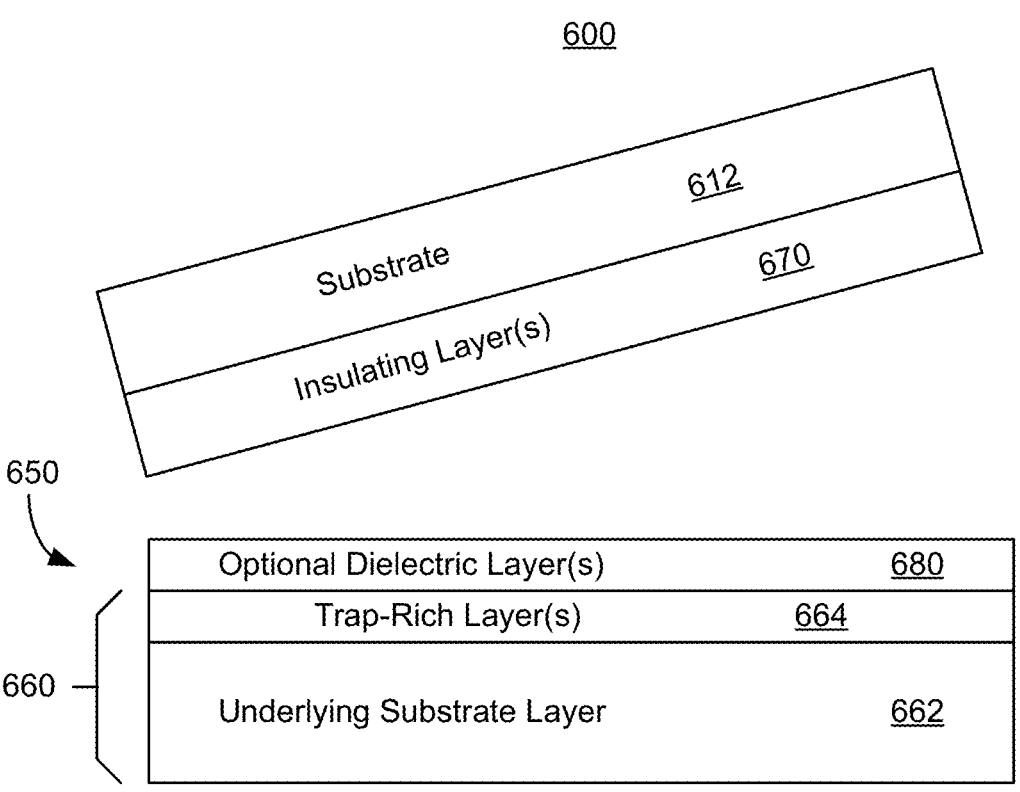
FIGS. 6A-6E depict an embodiment of a substrate for electro-optic devices having a trap-rich substrate structure during fabrication.

FIGS. 6A-6E depict an embodiment of substrate 600 for electro-optic devices having a trap-rich substrate structure during fabrication using method 500. FIGS. 6A-6E are not to scale. FIG. 6A depicts electro-optic device after semiconductor substrate 660 is formed. Thus, semiconductor substrate 660 includes trap-rich layer(s) 664 and underlying substrate layer 662 that are analogous to layers 162 and 164. Semiconductor substrate 660 is provided at 502. Optional dielectric layer(s) 680 are analogous to dielectric layer(s) 280 and provided at 504. Also shown in FIG. 6A is insulating layer 670 on a handle substrate 612. Insulating layer 670 may be thermally grown on handle substate 612. Insulating layer 670 is analogous to insulating layer 170. Thus, insulating layer 670 may have the desired thickness and thickness variation described herein.

Figure 6C:
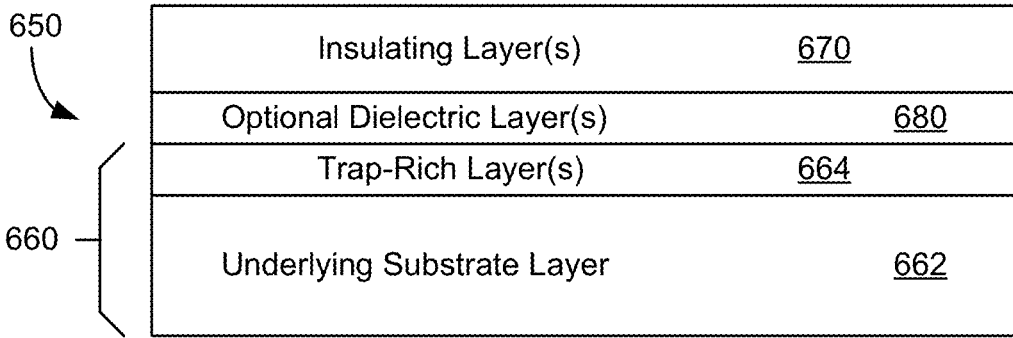
Figure 6D:
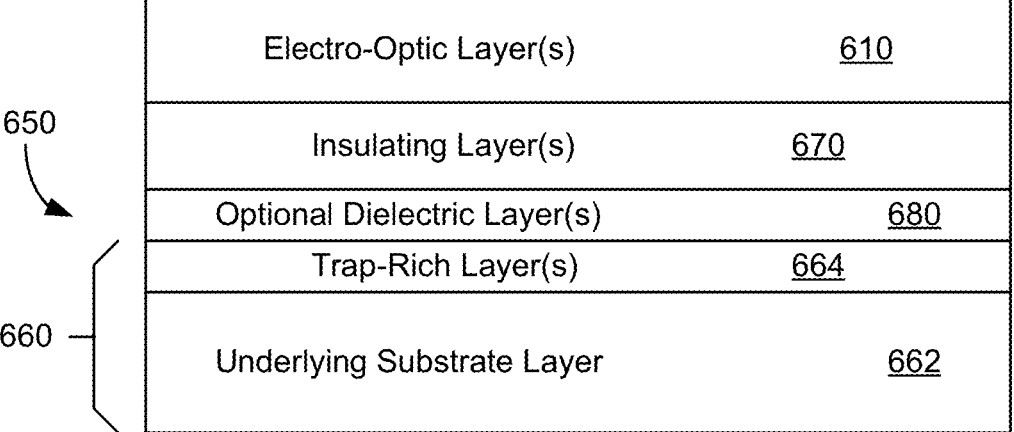
Figure 6E:
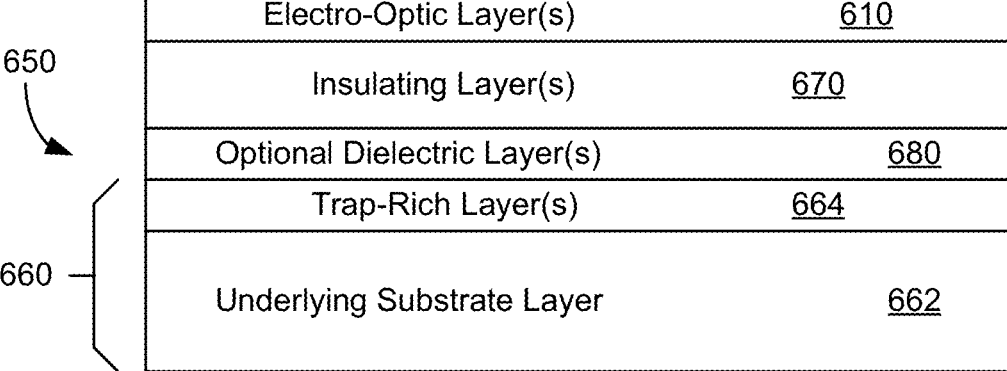

At 506, insulating layer 670 is bonded to dielectric layer(s) 680 (if present) or to trap-rich layer(s) 664 (if dielectric layer(s) 680 is not present). The resulting structure is shown in FIG. 6B. Substrate 612 may then be removed. The substrate structure 650 that results is shown in FIG. 6C. Electro-optic layer(s) 610 are provided at 508. The resulting structure is shown in FIG. 6D. Electro-optic layer(s) 610 are analogous to layer(s) 410 and may include LN and/or LT. Also as part of 508, electro-optic layer(s) 610 may thinned. FIG. 6E depicts the resulting substrate 600. Thus, electro-optic layer(s) 610 may have the desired thickness for fabrication of waveguides and other structures. Substrate 600 may then be used to provide electro-optic devices having the benefits described herein.

Figure 7A:
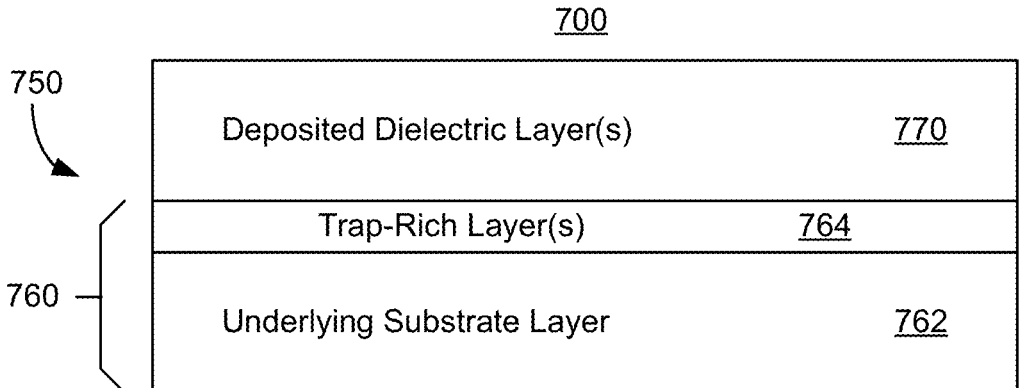
FIGS. 7A-7C depict an embodiment of a substrate for electro-optic devices having a trap-rich substrate structure during fabrication.
Figure 7B:
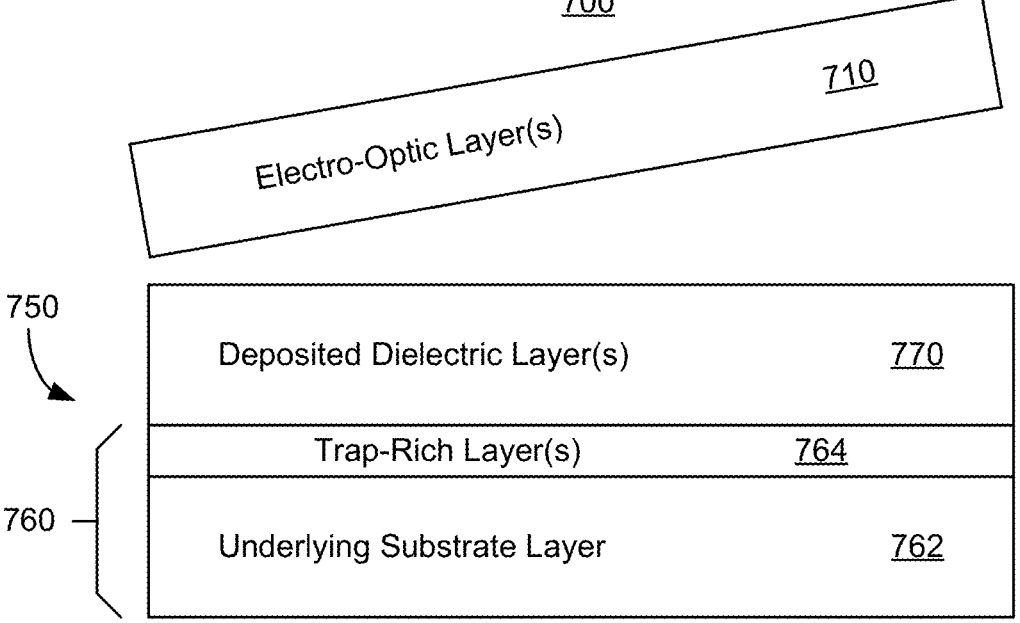
Figure 7C:
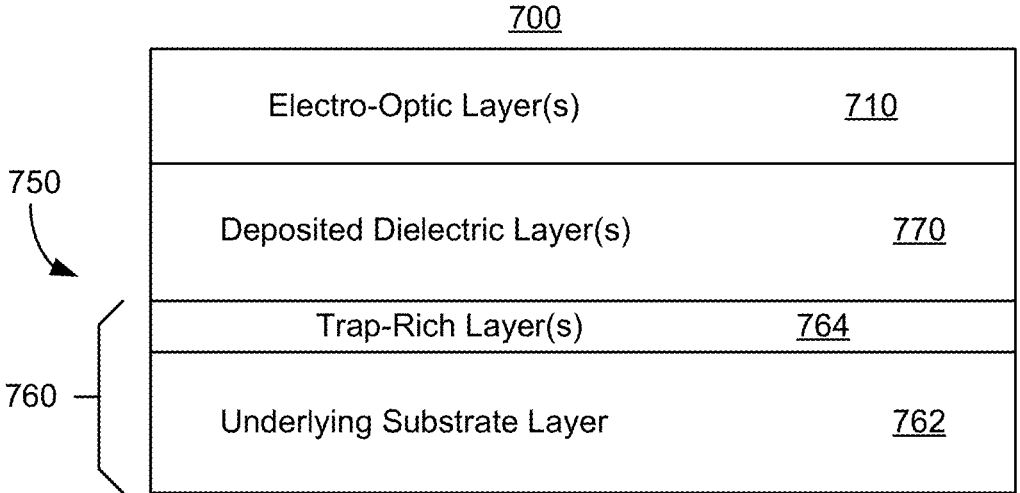

FIGS. 7A-7C depict an embodiment of substrate 700 for an electro-optic devices having a trap-rich substrate structure during fabrication using met hod 500. FIGS. 7A-7C are not to scale. FIG. 7A depicts substrate 700 after 502 and 506 have been performed. 504 has been skipped. Semiconductor substrate 760 has been formed by providing trap-rich layer(s) 764 on underlying substrate 762. Trap-rich layer(s) 764 and underlying substrate layer 762 are analogous to layers 162 and 164. Insulating layer 770 has been provided by depositing a dielectric, such as silicon dioxide, on semiconductor substrate 760. Insulating layer is analogous to insulating layer 170. Thus, insulating layer 770 may have the desired thickness and thickness variation described herein.

Electro-optic layer(s) 710 are provided at 508. Electro-optic layer(s) 710 are analogous to layer(s) 410 and may include LN and/or LT. Electro-optic layer(s) 710 may be affixed to deposited dielectric layer(s) 770. This process is indicated in FIGS. 7B and 7C. In some embodiments, electro-optic layer(s) 710 may also thinned. FIG. 7C depicts the resulting substrate 700. Thus, substrate 700 may then be used to provide electro-optic devices having the benefits described herein.

Figure 8A:
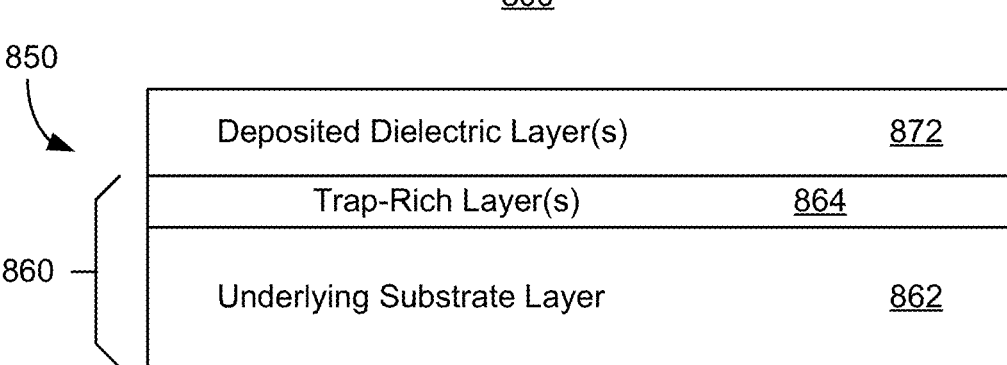
FIGS. 8A-8C depict an embodiment of a substrate for electro-optic devices having a trap-rich substrate structure during fabrication.
Figure 8B:
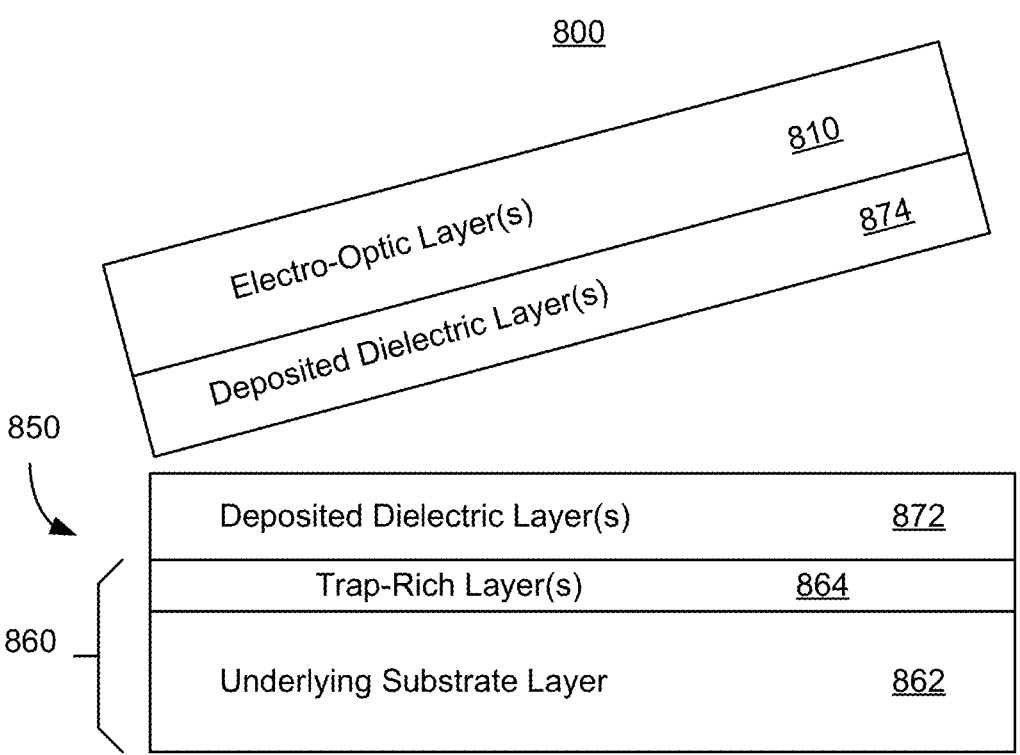
Figure 8C:
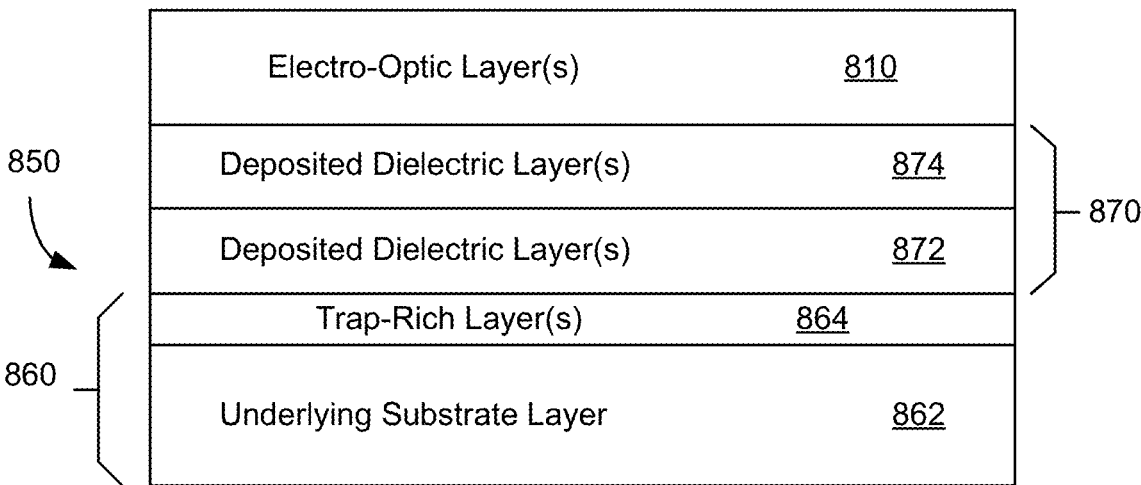

FIGS. 8A-8C depict an embodiment of substrate 800 for an electro-optic device having a trap-rich substrate structure during fabrication. FIGS. 8A-8C are not to scale. FIG. 8A depicts electro-optic device 800 after 502 and a portion 506 have been performed. 504 has been skipped. Semiconductor substrate 860 has been formed by providing trap-rich layer(s) 864 on underlying substrate 862. Trap-rich layer(s) 864 and underlying substrate layer 862 are analogous to layers 162 and 164. Insulating layer 872 has been provided by depositing a dielectric, such as silicon dioxide, on semiconductor substrate 860. Insulating layer 872 is to form a portion of a layer analogous to insulating layer 170. Thus, a portion of 506 is performed.

FIG. 8B depicts substrate 800 during another portion of 506. Deposited dielectric layer 874 has been provided on electro-optic layer(s) 810. For example, silicon dioxide may be deposited on electro-optic layer(s) 810. Deposited dielectric 872 is affixed to deposited dielectric 872, also as part of 506. 508 may also be considered to be performed because electro-optic layer is also provided for substrate structure 800. FIG. 8C depicts the resulting substrate structure. Layers 872 and 874 form insulating layer 870. Insulating layer 870 is analogous to insulating layer 170. Thus, insulating layer 870 may have the desired thickness and thickness variation described herein. In some embodiments, electro-optic layer(s) 810 may also thinned. FIG. 7C depicts the resulting substrate 800. Thus, substrate 800 may then be used to provide electro-optic devices having the benefits described herein.

Figure 9A:
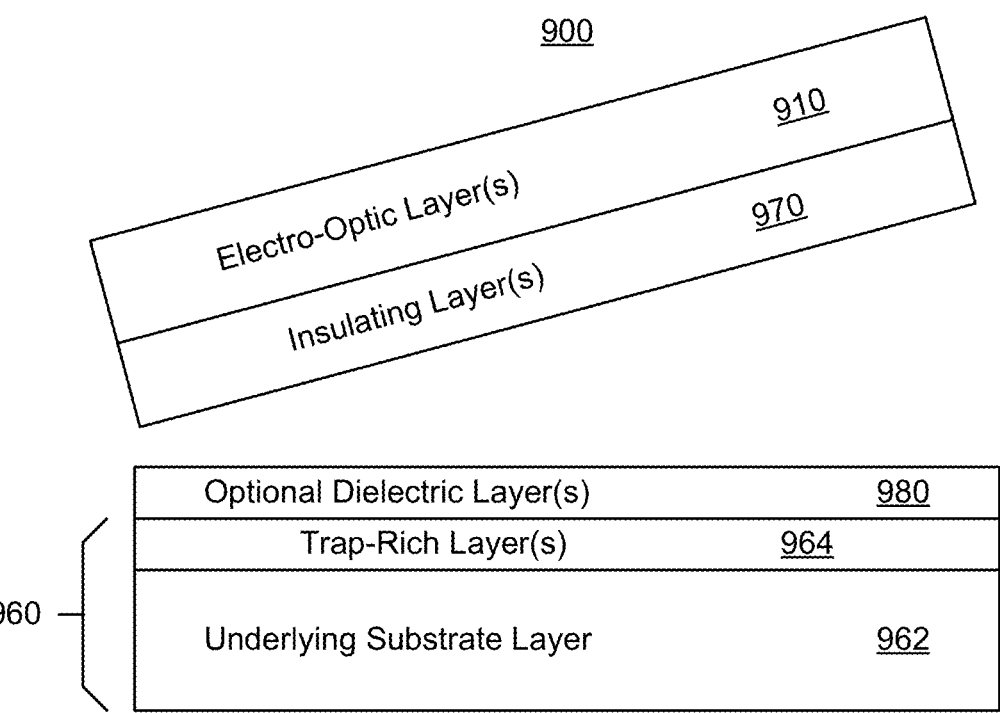
Figure 9B:
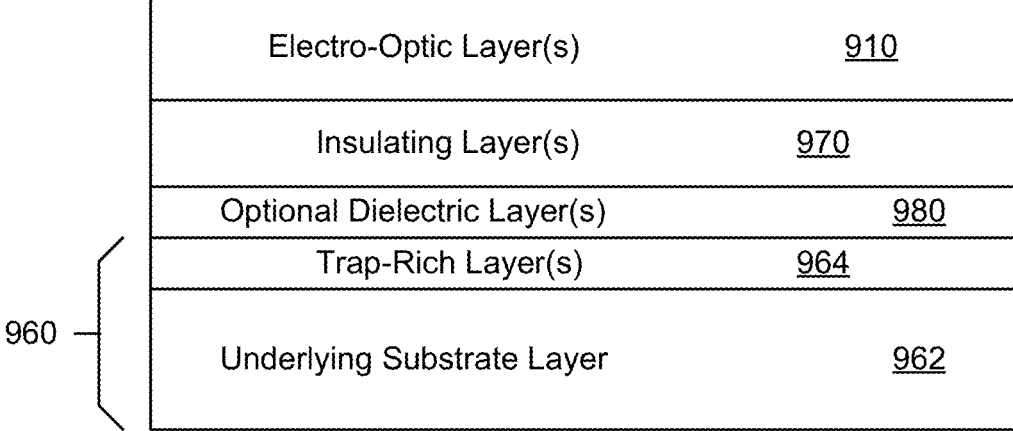

FIGS. 9A-9C depict an embodiment of substrate structure 900 for electro-optic devices having a trap-rich substrate structure during fabrication. FIGS. 9A-9C are not to scale. FIG. 9A depicts substrate 900 after 502, 504, and a portion 506 have been performed. Semiconductor substrate 960 has been formed by providing trap-rich layer(s) 964 on underlying substrate 962. Trap-rich layer(s) 964 and underlying substrate layer 962 are analogous to layers 162 and 164. Insulating layer 970 has been provided by depositing a dielectric, such as silicon dioxide, on electro-optic layer(s) 910. Thus, insulating layer 970 may have the desired thickness and thickness variation described herein.

FIG. 9B depicts substrate 900 after 506 and part of 508 have been performed. Insulating layer 970 and electro-optic layer 910 have been affixed to semiconductor substrate 960 and, if present, dielectric layer(s) 980. In some embodiments, electro-optic layer 910 is also thinned as part of 508. FIG. 9C depicts the resulting substrate structure. Thus, substrate 900 may then be used to provide electro-optic devices having the benefits described herein.

Although the foregoing embodiments have been described in some detail for purposes of clarity of understanding, the invention is not limited to the details provided. There are many alternative ways of implementing the invention. The disclosed embodiments are illustrative and not restrictive.

US 12,566,343 B2

15

What is claimed is:

1. A substrate configured for a high-speed electro-optic device, comprising:
a semiconductor substrate including a trap-rich layer and an underlying substrate layer;
an insulating layer on the semiconductor substrate, the trap-rich layer being between the underlying substrate layer and the insulating layer, the insulating layer having a thickness of at least five micrometers and a thickness variation of less than ten percent of the thickness, at least a portion of the insulating layer being bonded to the semiconductor substrate; and
at least one thin film optical material having an electro-optic effect and being on the insulating layer such that the insulating layer is between the trap-rich layer and the at least one thin film optical material, the at least one thin film optical material includes lithium,
wherein the trap-rich layer is configured for wafer bonding.

2. The substrate of claim 1, wherein the at least one thin film optical material includes at least one of lithium niobate or lithium tantalate.

3. The substrate of claim 1, wherein the insulating layer has the thickness variation of less than five hundred nanometers across the insulating layer.

4. The substrate of claim 1, further comprising:
a dielectric layer between the insulating layer and the trap-rich layer.

5. The substrate of claim 4, wherein the insulating layer has the thickness variation of less than five hundred nanometers across the insulating layer.

6. The substrate of claim 1, wherein the trap-rich layer includes at least one of amorphous silicon and polysilicon.

7. The substrate of claim 1, wherein the insulating layer is wafer bonded directly to the trap-rich layer.

8. A high-speed electro-optic device, comprising:
a waveguide including at least one thin film electro-optic layer, the at least one electro-optic layer including lithium; and
an electrode;
wherein the waveguide and the electrode are on a substrate structure, the substrate structure including a semiconductor substrate and an insulating layer, the semiconductor substrate including a trap-rich layer and an underlying substrate layer, the insulating layer being on the semiconductor substrate and between the trap-rich layer and the at least one thin film electro-optic layer, the insulating layer having a thickness of at least five micrometers and a thickness variation of less than ten percent of the thickness, the trap-rich layer being between the underlying substrate layer and the insulating layer, the at least one thin film electro-optic layer being on the insulating layer, at least a portion of the insulating layer being bonded to the substrate structure;
wherein the trap-rich layer is configured for wafer bonding.

9. The electro-optic device of claim 8, wherein the insulating layer has at least one of the thickness variation of less than ten percent or the thickness variation of less than five hundred nanometers across the insulating layer.

10. The electro-optic device of claim 8, further comprising:
a dielectric layer between the insulating layer and the trap-rich layer.

11. The electro-optic device of claim 10, wherein the insulating layer has at least one of the thickness variation of less than five hundred nanometers across the insulating layer or the thickness variation of less than ten percent.

12. The electro-optic device of claim 8, wherein the trap-rich layer includes at least one of amorphous silicon and polysilicon.

13. The electro-optic of claim 8, wherein the insulating layer is wafer bonded directly to the trap-rich layer.

14. A method for providing a high-speed electro-optic device, comprising:
affixing an insulating layer to a semiconductor substrate including a trap-rich layer and an underlying substrate layer, the trap-rich layer being between the underlying substrate layer and the insulating layer, the insulating layer having a thickness of at least five micrometers and a thickness variation of less than ten percent of the thickness; and
providing at least one thin film optical material having an electro-optic effect such that the insulating layer is between the at least one thin film optical material and the trap-rich layer, the at least one thin film optical material includes lithium;
wherein the trap-rich layer is configured for wafer bonding.

15. The method of claim 14, wherein the insulating layer has at least one of the thickness variation of less than ten percent or the thickness variation of less than five hundred nanometers across the insulating layer.

16. The method of claim 14, wherein the affixing the insulating layer further includes:
wafer bonding the insulating layer directly to the trap-rich layer.

* * * * *